United States Patent
Dick et al.

(10) Patent No.: US 8,155,071 B1
(45) Date of Patent: Apr. 10, 2012

(54) CROSS-LAYER ALLOCATION OF SPECTRAL RESOURCE TO SPATIALLY MULTIPLEXED COMMUNICATION

(75) Inventors: Christopher H. Dick, San Jose, CA (US); Jorn W. Janneck, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 464 days.

(21) Appl. No.: 12/477,038

(22) Filed: Jun. 2, 2009

(51) Int. Cl.
*H04W 4/00* (2009.01)

(52) U.S. Cl. ............. 370/329; 455/403; 455/422.1; 455/450

(58) Field of Classification Search .......... 370/328–329; 455/450–454
See application file for complete search history.

(56) References Cited

U.S. PATENT DOCUMENTS

| | | | |
|---|---|---|---|
| 6,956,834 B2 * | 10/2005 | Stanwood et al. | 370/329 |
| 2003/0021245 A1 * | 1/2003 | Haumonte et al. | 370/330 |
| 2006/0205357 A1 * | 9/2006 | Kim | 455/69 |
| 2007/0162827 A1 * | 7/2007 | Walton et al. | 714/774 |
| 2008/0240032 A1 * | 10/2008 | Gelbman et al. | 370/329 |

* cited by examiner

Primary Examiner — Hassan Kizou
Assistant Examiner — Charles C Jiang
(74) Attorney, Agent, or Firm — LeRoy D. Maunu (57) ABSTRACT

A system detects a communication transmitted from multiple transmitting antennas. The system includes a media access controller and a physical block. Based on a signal to noise ratio (SNR), the allocation circuit of the media access controller assigns a portion of a spectral resource to the communication. The physical block includes multiple receiving antennas for receiving the communication, an estimating circuit for determining the SNR of the communication received at the receiving antennas, and a sphere detector. The sphere detector calculates a respective cost for possible combinations of symbols for the transmitting antennas. The sphere detector calculates the respective costs of the possible combinations from the portion of the spectral resource of the communication received at the receiving antennas. The sphere detector selects one of the possible combinations in response to the respective costs. The system detects the transmitted communication to be the symbols of the selected combination.

20 Claims, 5 Drawing Sheets

CROSS-LAYER ALLOCATION OF SPECTRAL RESOURCE TO SPATIALLY MULTIPLEXED COMMUNICATION

FIELD OF THE INVENTION

The present invention generally relates to wireless communication, and more particularly to spatially multiplexed wireless communication.

BACKGROUND

Data can be transmitted electromagnetically between a transmitting and a receiving antenna. The transmitter encodes the data into a sequence of symbols selected from a symbol constellation. The transmitting antenna transmits the symbols and the receiving antenna detects the symbols.

Interference from noise and reflections corrupts the symbols received by the receiving antenna. For a maximum-likelihood detector, the receiver can compare the received signal with the expected received signal for all of the symbols in the constellation. The expected received signal that most closely matches the actually received signal provides the detected symbol.

The data transfer rate of electromagnetic communication increases by transmitting multiple symbols in parallel from multiple transmitting antennas. The detection of the multiple transmitted symbols improves by receiving the symbols with multiple receiving antennas.

For maximum-likelihood detection with multiple transmitting antennas, the number of possible combinations of symbols transmitted in parallel is the degree of the constellation raised to the power of the number of transmitting antennas. Evaluation of all possible combinations is infeasible for higher order modulation and a large number of antennas.

The present invention may address one or more of the above issues.

SUMMARY

Various embodiments of the invention provide a system for detecting a communication transmitted from multiple transmitting antennas. The system includes a media access controller and a physical block. Based on a signal to noise ratio (SNR), the allocation circuit of the media access controller assigns a portion of a spectral resource to the communication. The physical block includes multiple receiving antennas for receiving the communication from the transmitting antennas, an estimating circuit for determining the SNR of the communication received at the receiving antennas, and a sphere detector. The sphere detector calculates a respective cost for possible combinations of symbols for the transmitting antennas. The sphere detector calculates the respective costs of the possible combinations from the portion of the spectral resource of the communication received at the receiving antennas. The sphere detector selects one of the possible combinations in response to the respective costs. The system detects the transmitted communication to be the symbols of the selected combination.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

Figure 1:
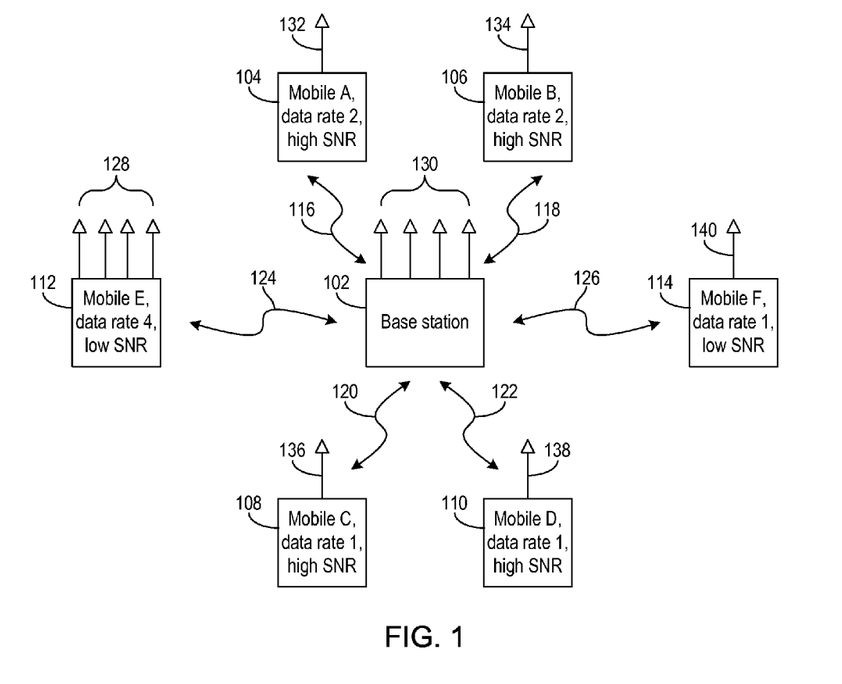
FIG. 1 is a block diagram illustrating an example of communications spatially multiplexed between a base station and multiple mobile agents in accordance with various embodiments of the invention.

FIG. 1 is a block diagram illustrating an example of communications spatially multiplexed between a base station 102 and multiple mobile agents 104, 106, 108, 110, 112, and 114 in accordance with various embodiments of the invention. In this example, the communications 116, 118, 120, and 122 have a high signal-to-noise ratio (SNR), because mobile agents 104, 106, 108, and 110 are currently nearby base station 102 for example. The communications 124 and 126 have a low SNR, because the mobile agents 112 and 114 are currently far away from base station 102 for example. In this example, mobile agent 112 requires a high data rate for the communications 124, mobile agents 104 and 106 require a medium data rate for the communications 116 and 118, and mobile agents 108, 110, and 114 require a low data rate for the communications 120, 122, and 126.

In various embodiments, the communications 116, 118, 120, 122, 124, and 126 are unidirectional communications from the base station 102, unidirectional communications to the base station 102, and/or bidirectional communications between the base station 102 and the mobile agents 104, 106, 108, 110, 112, and 114.

The communications 116, 118, 120, 122, 124, and 126 are spatially multiplexed wireless communications. In one example, mobile agent 112 simultaneously transmits four symbols from the four antennas 128, respectively. The four antennas 130 of the base station 102 receive weighted sums of the symbols transmitted from the transmitting antennas 128. In another example, the antennas 130 of the base station 102 simultaneously transmit four symbols to the antennas 128 of mobile agent 112. Thus, the antennas 128 of the mobile agent 112 can be either transmitting or receiving antennas depending on the current direction of communication 124, and the antennas 130 of the base station 102 can correspondingly be either receiving or transmitting antennas. In yet another example, mobile agents 104, 106, 108, and 110 simultaneously transmit a symbol from respective antennas 132, 134, 136, and 138, and base station 102 receives weighted sums of these symbols at antennas 130. Thus, the transmitting antennas can be antennas of one or more devices. However, the receiving antennas are generally antennas of a single device that processes the received weighted sums of the symbols to determine the transmitted symbols.

A model for the communication channel between transmitting antennas and the receiving antennas is:

$$y = Hs + n$$

where H is an N×M channel matrix between the N receiving antennas and the M transmitting antennas, s is a column vector of M symbols transmitted from the transmitting antennas, n is a column vector of N received noise elements, and y is a column vector of N signals received at the receiving antennas. Each of the M transmitted symbols in column vector s is a symbol from a constellation having an order of w symbols.

In one embodiment, the channel matrix is decomposed into a triangular matrix. The triangular matrix is an upper triangular matrix from a QR decomposition of the channel matrix. The detection of the transmitted symbols includes determining the M symbols in column vector s that minimize the distance norm:

$$D(s) = \|y - Hs\|^2 = \|Q^H y - Rs\|^2 = \sum_{i=M}^{1} \left| y'_i - \sum_{j=i}^{M} R_{ij} s_j \right|^2$$

where H=QR, $QQ^H = I$, and $y' = Q^H y$. The summations derive from R being an upper triangular matrix. The outer summation from i=M down to 1 is a summation of a corresponding term for each of the transmitting antennas beginning from the last antenna. The corresponding term of the outer summation for each transmitting antenna is denoted by the partial distance for the transmitting antenna. The partial distance for a particular transmitting antenna with index i includes an inner summation of a weighting of the candidate symbols from transmitting antennas i to M. Thus, the QR decomposition permits calculating the distance norm D(s) for candidate symbols s by summing a partial distance for each index of a transmitting antenna, and the partial distance for each index is a function of the symbols having the same and larger indices.

Various embodiments of the invention detect the transmitted symbols by computing the distance norm for various combinations selected from all combinations of M symbols in the constellation. The M symbols actually transmitted from the M transmitting antennas should match the combination that has the smallest value of the distance norm.

The mobile agents 104, 106, 108, 110, 112, and 114 can require different quality of service (QOS). QOS can include bandwidth and reliability requirements. For example, a communication carrying a video stream requires more bandwidth than a communication carrying an audio stream, but both video and audio streams have low reliability requirements because many video and audio applications readily tolerate brief data corruption.

In this example, mobile agents 108, 110, and 114 require the same QOS bandwidth of one symbol every four time periods; these time periods are denoted slot times in certain embodiments of the invention. Additionally, mobile agents 104 and 106 require twice the QOS bandwidth, and mobile agent 112 requires quadruple the QOS bandwidth. However, mobile agents 112 and 114 have a worse SNR than the other mobile agents 104, 106, 108, and 110. To achieve the required QOS for mobile agents 112 and 114 having the lower SNR, base station 102 allocates extra spectral resources to these mobile agents 112 and 114 in various embodiments of the invention. The extra spectral resources simplify detecting the noisy communications 124 and 126.

It will be appreciated that the base station 102 can have more than four or less than four antennas 130, and that base station 102 can simultaneously transmit or simultaneously receive a number of symbols up to and including the number of antennas 130. In addition, a number of mobile agents up to the number of antennas 130 can simultaneously transfer symbols to the base station 102.

Figure 2A:
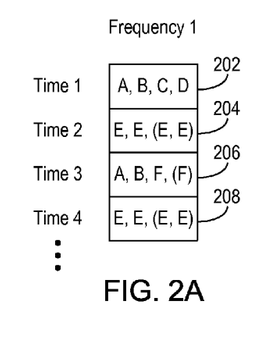
FIGS. 2A and 2B are frequency-time diagrams illustrating example assignments of slots of time and frequency to the mobile agents of FIG. 1 in accordance with various embodiments of the invention.
Figure 2B:
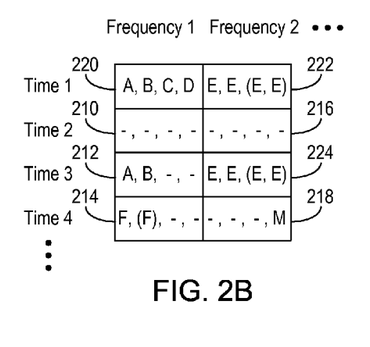

FIGS. 2A and 2B are frequency-time diagrams illustrating example assignments of slots of time and frequency to the mobile agents of FIG. 1 in accordance with various embodiments of the invention. During the time period of each slot, up to four antennas concurrently transmit respective symbols at the frequency of the slot. Each of the slots 202, 204, 206, and 208 in FIG. 2A is labeled with identifiers of the mobile agents assigned to the time and frequency of the slot. The slots of FIG. 2B are similarly labeled. In certain embodiments, the example assignments also include assigning a direction for the communication of each symbol, with the assigned direction either being from base station to mobile agent or from mobile agent to base station.

During slot 202, mobile agents 104, 106, 108, and 110 each modulate a carrier frequency to transmit a symbol from respective antennas 132, 134, 136, and 138. Base station 102 detects the transmitted symbols from the communications 116, 118, 120, and 122 received at antennas 130. During slot 204, communication 124 transfers two symbols between mobile agent 112 and base station 102, even though four symbols could be transferred between antennas 128 and 130. Transferring only two symbols during slot 204 helps compensate for the low SNR of communication 124. Thus, slot 204 is labeled with two identifiers in parenthesis to show mobile agent 112 is assigned all four possibly transferred symbols for slot 204, but only two symbols are actually transferred in slot 204. During slot 206, mobile agents 104, 106, and 114 each transmit a symbol to base station 102 from respective antennas 132, 134, and 140. Again, transferring less than four symbols helps compensate for the low SNR of the communication 126.

In FIG. 2A, every fourth slot has the same mobile agents assigned in a repeating pattern. Thus, two symbols are transferred with mobile agent 104 every four slots like slots 202 and 206, two symbols are transferred with mobile agent 106 every four slots like slots 202 and 206, one symbol is transferred with mobile agent 108 every four slots like slot 202, and one symbol is transferred with mobile agent 110 every four slots like slot 202. In addition, eight possible symbols are reserved for transferring four symbols with mobile agent 112 every four slots like slots 204 and 208, and two possible symbols are reserved for transferring one symbol with mobile agent 114 every four slots like slot 206. Thus, base station 102 assigns mobile agents 104 through 114 to slots to satisfy the QOS bandwidth requirements and to compensate for the low SNR of received communications 124 and 126.

FIG. 2B includes slots of both time and frequency. In one embodiment, a range of radio frequencies in an electromagnetic spectrum is subdivided into multiple subcarrier frequencies. The base station 102 assigns certain time periods on one or more of the subcarrier frequencies to the mobile agents 104 through 114 to satisfy the QOS requirements of the mobile agents 104 through 114 and to compensate for any poor SNR of the received communications 116 through 126. The slots 210, 212, 214, 216, and 218 including a "dash" label have unassigned potential symbol transfers, and the slot 218 with the "M" label can be used to transfer management data, such as the base station 102 transmitting to the mobile agents 104 through 114 the current slot assignments, and the mobile agents 104 through 114 transmitting to the base station 102 the SNR of the received communications 116 through 126.

The slots of time and frequency are spectral resources allocated or assigned to the mobile agents 104 through 114. Because the communications 116 through 126 are spatially multiplexed between the antennas 128 through 140, each slot of the spectral resource includes a spatial subportion given by the antennas assigned to transmit in the slot.

Figure 3:
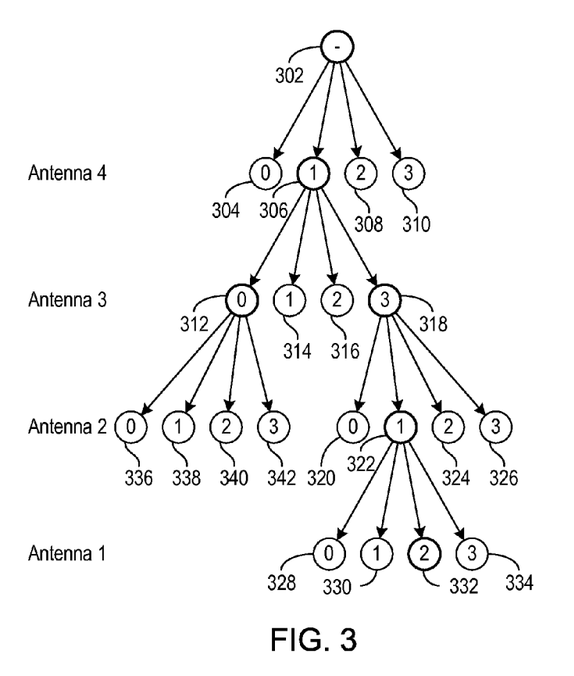
FIG. 3 is a graph diagram of an example search tree for depth-first-search sphere detector at high signal-to-noise ratio in accordance with various embodiments of the invention.

FIG. 3 is a graph diagram of an example search tree for depth-first-search sphere detector at high SNR in accordance with various embodiments of the invention. The graph diagram corresponds to decoding performed during a particular slot of time and frequency for communications having a high SNR, such as slots 202 and 220 in FIGS. 2A and 2B. Each node except the root node 302 includes a label specifying the symbol possibly transmitted from the corresponding transmitting antenna. Each path from the root node 302 to a leaf node, such as leaf node 332, represents a combination of symbols possibly transmitted from the transmitting antennas.

The depth-first-search sphere detector can perform an exhaustive search that visits nodes for every possible combination of symbols for the transmitting antennas. However, pruning can reduce the number of nodes actually visited, especially after visiting the node corresponding to the symbols actually transmitted from the transmitting antennas. When the SNR is high, signal distortion from noise is low and the first leaf node visited in the search tree often matches the symbols actually transmitted.

The search begins from root node 302 of a root level of the search tree. Nodes 304, 306, 308, and 310 correspond to the four symbols in a constellation for the communication. Nodes 304, 306, 308, and 310 represent the four potential choices for the symbol transmitted from the antenna having index four. In one embodiment, partial distances are evaluated for the nodes 304, 306, 308, and 310 of the level for antenna four. Node 306 with the smallest partial distance is expanded into nodes 312, 314, 316, and 318 representing antenna three respectively transmitting symbol-0, symbol-1, symbol-2, and symbol-3, along with the antenna four transmitting symbol-1.

Among nodes 312, 314, 316, and 318, node 318 has the smallest partial distance and node 312 has the next smallest partial distance in this example. Node 318 with the smallest partial distance is expanded next into nodes 320, 322, 324, and 326 for the level of antenna two. Among these nodes, node 322 has the smallest partial distance and is expanded into the leaf nodes 328, 330, 332, and 334 of a leaf level of the search tree. Among these nodes, initial solution node 332 has the smallest distance and represents the antennas with indices one, two, three, and four respectively transmitting symbol-2, symbol-1, symbol-3, and symbol-1.

Because node 332 has a smaller distance than nodes 328, 330, and 334, nodes 328, 330, and 334 should not correspond to the symbols actually transmitted. Similarly, node 332 has a smaller distance than the partial distances of nodes 320, 324, and 326 in this particular example. The depth-first search prunes nodes 320, 324, and 326, because the nodes that would result from expanding nodes 320, 324, and 326 would have a still larger distance than current solution node 332.

The depth-first search backtracks to nodes 312, 314, and 316. In this particular example, the depth-first search next expands node 312 because node 312 has a partial distance that is smaller than the distance of current solution node 332. However, the nodes 336, 338, 340, and 342 resulting from expanding node 312 have larger partial distances than the distance of current solution node 332, and consequently the depth-first search prunes nodes 336, 338, 340, and 342. Nodes 314 and 316 similarly have larger partial distances than the distance of current solution node 332, and the depth-first search prunes nodes 314 and 316. The depth-first search backtracks to nodes 304, 308, and 310. In this example, the depth-first search prunes nodes 304, 308, and 310 because they have a larger partial distance than the distance of current solution node 332.

Because no more nodes remain for expansion, the first solution node 332 found is the final solution. When the SNR is high for the communications from all antennas as in this particular example, the first leaf node 332 visited during the depth-first search is often the final solution specifying the symbols detected as transmitted by the transmitting antennas, and pruning dramatically limits the nodes visited during the depth-first search.

Figure 4:
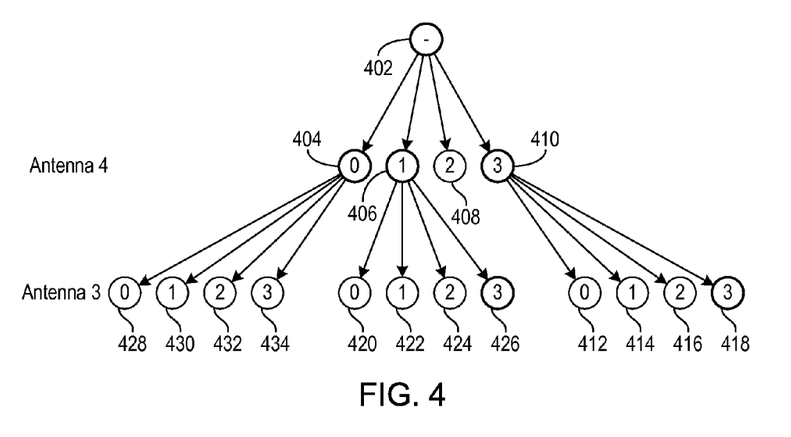
FIG. 4 is a graph diagram of an example search tree for depth-first-search sphere detector at low signal-to-noise ratio in accordance with various embodiments of the invention.

FIG. 4 is a graph diagram of an example search tree for depth-first-search sphere detector at low SNR in accordance with various embodiments of the invention. The graph diagram corresponds to decoding performed during slots 204, 208, 222, and 224 in FIGS. 2A and 2B. Because these slots are for low SNR communication, each slot transfers only two symbols, even though each slot could transfer four symbols from the four transmitting antennas.

In one embodiment, two of the four antennas transmit symbols and the other two antennas do not transmit anything. Because two antennas are not transmitting, the depth-first search is simplified to two levels for the two antennas that are actually transmitting.

The depth-first-search begins at the root node 402, which is expanded into the nodes 404, 406, 408, and 410 of the level for antenna four. The depth-first search evaluates partial distances, and the node 410 with the smallest partial distance is selected for further expansion into leaf nodes 412, 414, 416, and 418 of the search tree. Among nodes 412, 414, 416, and 418, leaf node 418 has the smallest partial distance and becomes the initial solution.

The depth-first search backtracks and checks the node 406 with the next smallest partial distance after node 410 in the level for antenna four. Node 406 is expanded into nodes 420, 422, 424, and 426, with node 426 having the smallest partial distance among nodes 420, 422, 424, and 426. Because node 426 has a partial distance smaller than initial solution node 418, node 426 becomes the current solution node.

The depth-first search backtracks and checks the node 404 with the next smallest partial distance after nodes 410 and 406 of the level for antenna four. The depth-first search cannot prune node 404 in this example because node 404 has a smaller partial distance than the current solution node 426. The uncertainty from the large noise component in the calculated partial distances produces less pruning than when the SNR is high. Node 404 is expanded into nodes 428, 430, 432, and 434 all having a larger partial distance than the current solution node 426.

The depth-first search backtracks and checks the last node 408 in the level for antenna four. Because node 408 has a larger partial distance than current solution node 426, node 408 becomes the only node pruned in this example for low SNR.

Comparing the search trees of FIG. 3 and FIG. 4, the depth-first search visits twenty-one nodes in FIG. 3 and the depth-first search visits seventeen nodes in FIG. 4. Thus, the search efforts are roughly equal for the example depth-first searches of FIG. 3 and FIG. 4. However, if the antennas with indices two and one had also transmitted symbols in FIG. 4, then the search tree would extend two more corresponding levels. Because of the limited pruning at low SNR, the search effort for four transmitting antennas at low SNR would greatly exceed the search effort for four transmitting antennas at high SNR. Thus, search efforts for high and low SNR can be balanced by reducing the symbols transmitted during each slot for communications having a low SNR.

It will be appreciated that the number of symbols transmitted in a slot can be reduced without having idle transmitting antennas. In another embodiment, each of the two transmitted symbols could be transmitted from two antennas, such that all four transmitting antennas are transmitting. The search tree would extend to four levels for the transmitting antennas, but the search tree remains a simplified search tree. In addition, transmitting each symbol from two antennas would improve the low SNR by effectively doubling the transmitted signal for each symbol. In yet another embodiment, at low SNR four transmitting antennas transmit in a specific slot and additional idle slots are reserved to compensate for the resulting high effort for detecting the symbols transmitted in the specific slot.

Figure 5:
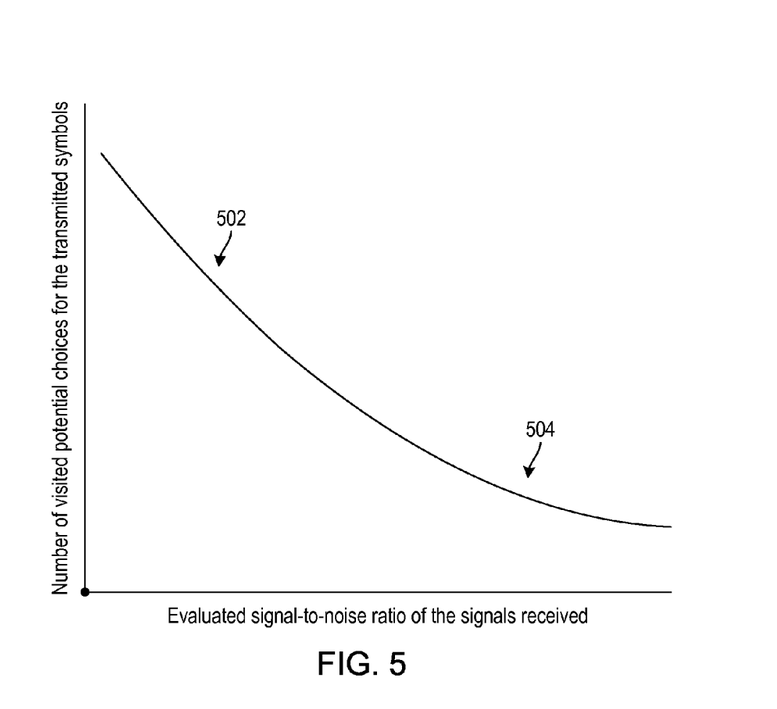
FIG. 5 is a graph diagram illustrating the relationship between decoding effort and signal-to-noise ratio in accordance with various embodiments of the invention.

FIG. 5 is a graph diagram illustrating the relationship between decoding effort and signal-to-noise ratio (SNR) in accordance with various embodiments of the invention. When the SNR is low in region 502, the search effort is high for visiting the nodes of the potential choices for the symbols transmitted by the transmitting antennas. When the SNR is high in region 504, the search effort is low.

Figure 6:
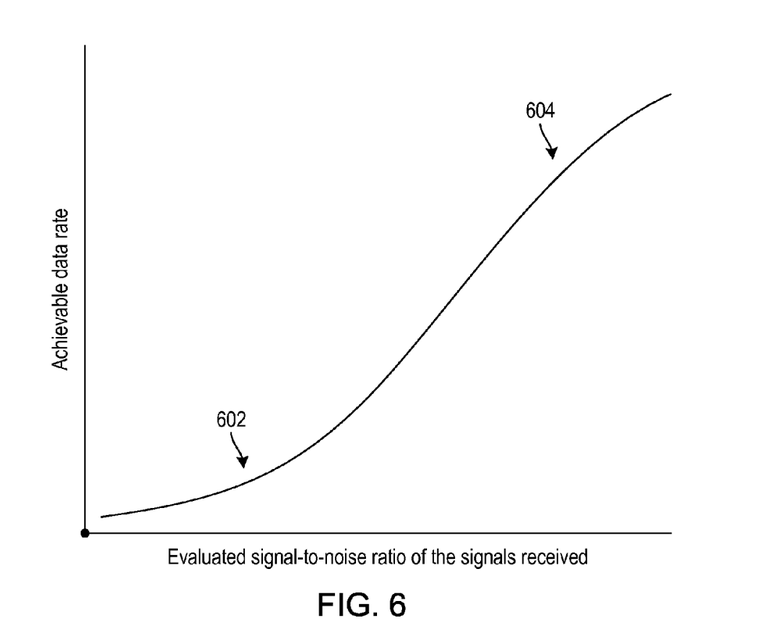
FIG. 6 is a graph diagram illustrating the relationship between achievable data rate and signal-to-noise ratio in accordance with various embodiments of the invention.

FIG. 6 is a graph diagram illustrating the relationship between achievable data rate and signal-to-noise ratio (SNR) in accordance with various embodiments of the invention. When the SNR is low in region 602, the achievable data rate is also low because of the high search effort required to detect the transmitted symbols. When the SNR is high in region 604, the achievable data rate is also high because the search effort is low at a high SNR.

Figure 7:
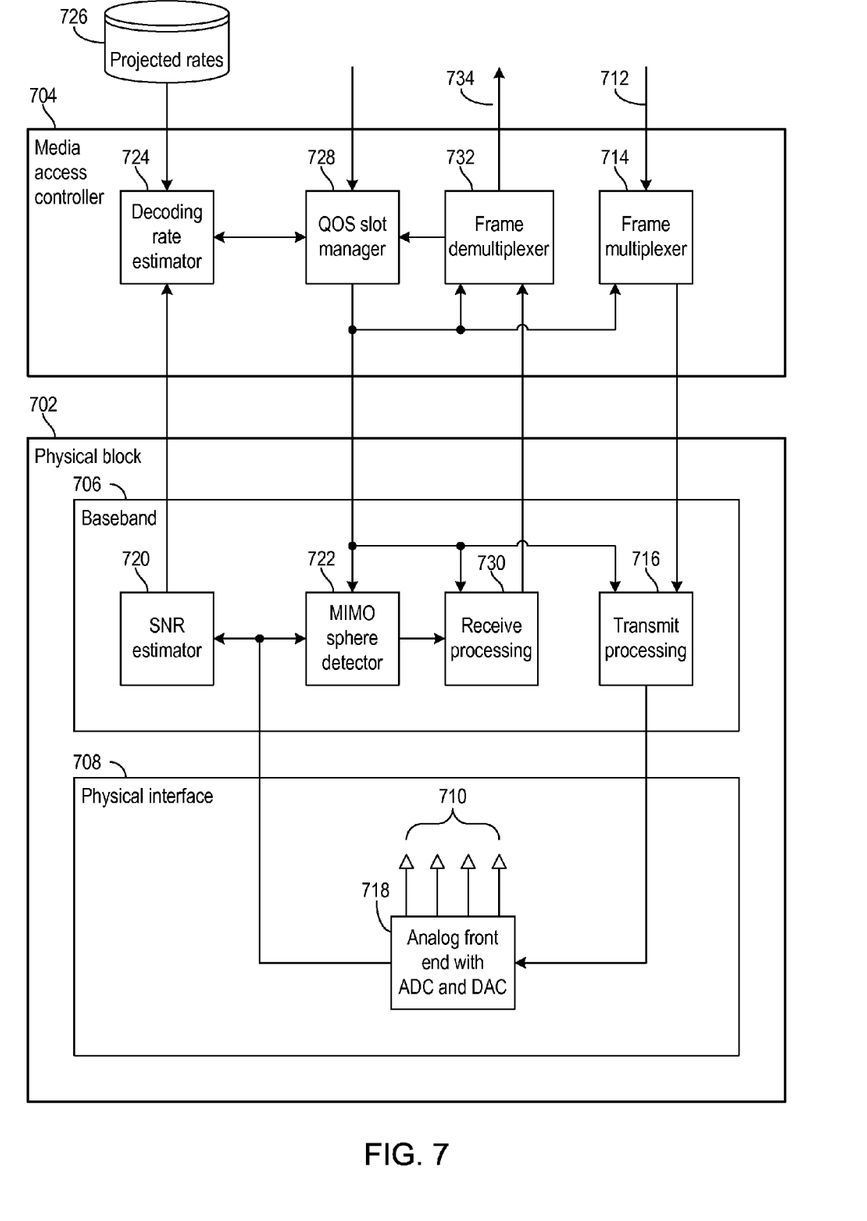
FIG. 7 is a block diagram of base station that processes communications in accordance with various embodiments of the invention.

FIG. 7 is a block diagram of base station that processes communications in accordance with various embodiments of the invention. The base station includes a physical (PHY) block 702 and a media access controller (MAC) 704. The physical block 702 handles transmitting and receiving symbols, and the MAC 704 handles transmitting and receiving frames of symbols. The physical block 702 include a baseband block 706 that processes a digital representation of the symbols, and a physical interface 708 that converts between the digital representation and analog signals for transmitting and receiving the symbols via antennas 710.

The MAC 704 receives frames on line 712 for transmission to remote mobile agents (not shown). The MAC 704 also generates management frames, and frame multiplexer 714 selects between these management frames and the frames received on line 712 from upper protocol layers of the base station.

The transmit processing block 716 of the baseband block 706 of the physical block 702 receives the symbols of a frame from frame multiplexer 714 and converts each symbol into a digital representation assigned for transmission during a specific slot from a specific one of antennas 710. The analog block 718 includes a digital to analog converter (DAC) that processes the digital representation of the symbols of each slot for transmission from antennas 710.

In one embodiment, the antennas 710 attempt to receive communications whenever the antennas 710 are not currently transmitting symbols. Thus, the base station can receive communications from remote agents whenever the base station is not currently transmitting a communication to a remote agent. An analog to digital converter (ADC) of the analog block 718 converts any communication received at antennas 710 into a digital representation of the communication.

The baseband block 706 receives the digital representation from the analog block 718 of the physical interface 708. The SNR estimator 720 estimates the SNR of the received communication. The sphere detector 722 converts the digital representation into a stream of symbols using a depth-first search of a tree of possibly transmitted symbols.

The decoding rate estimator 724 of the MAC 704 estimates the rate that the sphere detector 722 can detect symbols from the SNR provided by SNR estimator 720. In one embodiment, decoding rate estimator 724 queries a database 726 of projected rates. The decoding rate estimator 724 determines the projected rate in the database 726 that matches the SNR from SNR estimator 720. The projected rates in database 726 are a function of the SNR determined from a stochastic model of the operation of sphere detector 722.

The QOS slot manager 728 assigns mobile agents to antennas and slots of time and frequency to satisfy the bandwidth requirements for the mobile agents and to compensate for any low decoding rate for receiving transmissions from the mobile agents. In one embodiment, the number of assigned antennas within slots is proportional to the ratio of a specified data rate for the communication and an expected rate of a sphere detector detecting the symbols at the received SNR.

The QOS slot manager 728 generates an initial assignment for a mobile agent upon setting up a communication with the mobile agent. If the bandwidth requirements of the mobile agent change, the QOS slot manager 728 updates the assignment. The QOS slot manager 728 also updates the assignment to compensate for a deteriorating or improving SNR of the mobile agent.

For an initial or updated assignment to antennas and slots, the QOS slot manager 728 generates a management frame that communicates the assignment to the mobile agent, and this management frame is transmitted to the mobile agent via frame multiplexer 714, transmit processing block 716, analog block 718, and antennas 710. The remote agent responds by transmitting communications to the base station in the assigned slots via the assigned antenna or antennas, and by receiving communications from the base station in the assigned slots via the assigned antenna or antennas.

The QOS slot manager 728 also communicates assignment information to the sphere detector 722. In one embodiment, the sphere detector 722 is disabled for slots of time and frequency that are not assigned to any communication to the base station. This allows the sphere detector 722 to skip the processing for the disabled slot and instead process a queued communication from another slot. In another embodiment, only some of the antennas of a specific slot are assigned for communications to the base station, and the QOS slot manager 728 controls the sphere detector 722 to limit the levels of the search to the actually assigned antennas. This allows the sphere detector 722 to complete the processing for the specific slot quickly.

Receive processing block 730 also receives assignment information from the QOS slot manager 728. Receive processing block 730 uses the assignment information to associate each detected symbol from the sphere detector 722 with the appropriate mobile agent. The streams of received symbols assigned to mobile agents become frames of received symbols sent to the frame demultiplexer 732 of the MAC 704. The frame demultiplexer 732 sends the received frames that are not MAC management frames to the upper protocol layers via line 734.

In one embodiment, the QOS slot manager 728 also assigns management frames to certain slots for both received and transmitted management frames, and the QOS slot manager 728 appropriately steers the frame distributer 732 and the frame multiplexer 714 to receive and transmit the management frames.

The QOS slot manager 728 allocates slots and antennas for both received frames and transmitted frames. For received frames, the QOS slot manager 728 allocates slots and antennas based on the SNR that the MAC block 704 receives from the physical block 702, and the MAC block 704 provides this allocation to the physical block 702. Thus, the physical block 702 of the physical layer and the MAC block 704 of the MAC layer provide cross-layer allocation of the spectral resources of assigned slots and antennas. For transmitted frames, the QOS slot manager 728 provides the assignment to the transmit processing block 716, and the transmit processing block 716 transmits each symbol of a transmitted frame on the antenna and slot assigned to the destination mobile agent for the transmitted frame.

Figure 8:
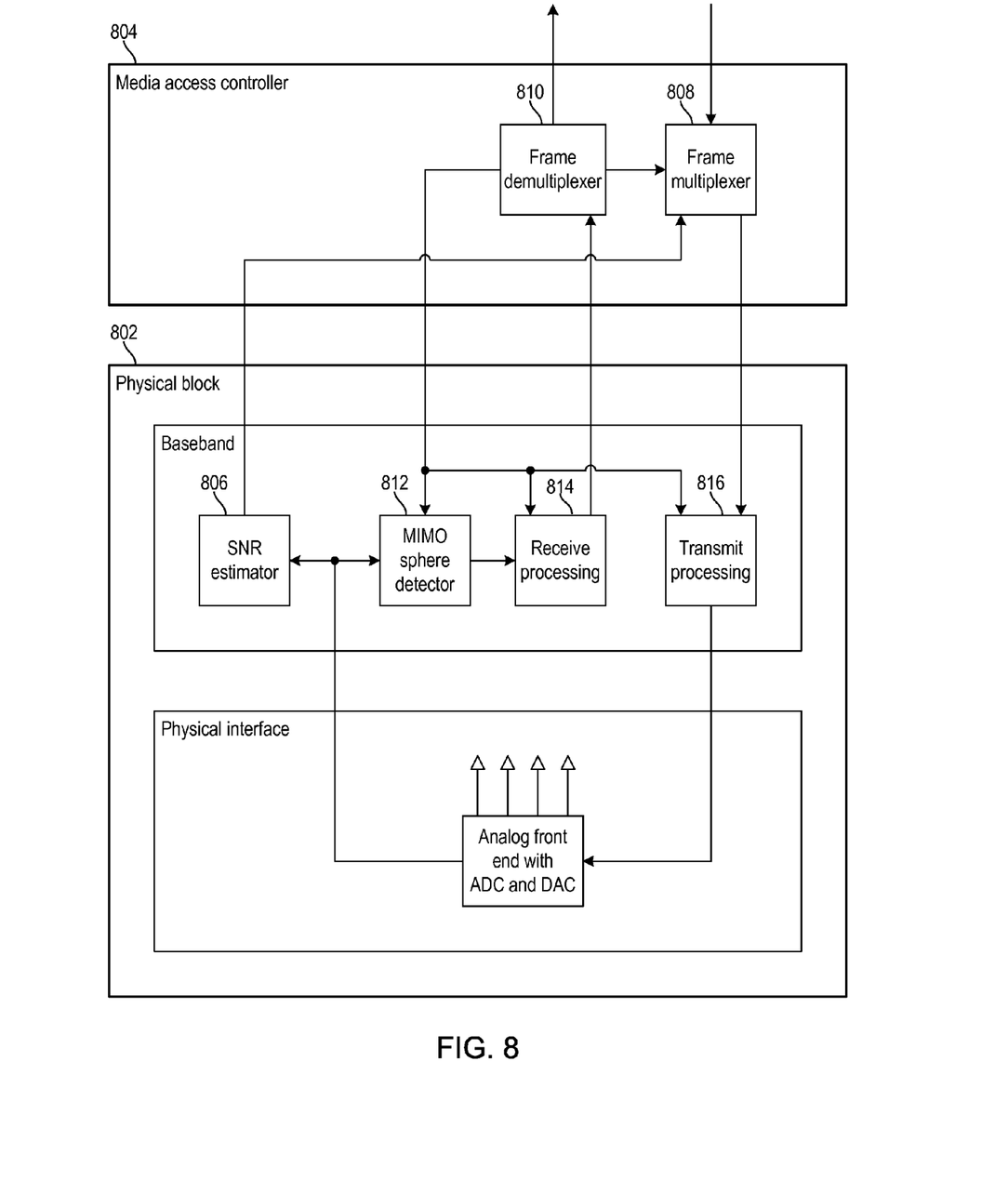
FIG. 8 is a block diagram of mobile agent that processes communications in accordance with various embodiments of the invention.

FIG. 8 is a block diagram of mobile agent that processes communications in accordance with various embodiments of the invention. The mobile agent is mostly a simplification of the base station of FIG. 7. The mobile agent includes a physical block 802 and a MAC 804.

The SNR estimator 806 estimates the SNR of communications received from the base station. The SNR estimator 806 provides the SNR to the frame multiplexer 808, and the frame multiplexer 808 sends a management frame including the SNR to the base station.

In one embodiment, a management frame from the base station specifies the slot and antenna assignments for the mobile agent to receive and transmit management frames. The frame demultiplexer 810 correspondingly steers the frame multiplexer 808 to transfer the SNR from SNR estimator 806 to the base station in a management frame.

Referring back to FIG. 7, the management frame with the SNR at the remote mobile agent is transferred to the QOS slot manager 728 via antennas 710, sphere detector 722, receive processing 730, and frame demultiplexer 732. The QOS slot manager 728 uses the SNR to allocate slots and antennas for transmitting frames to the remote mobile agent. The slots and antennas are assigned to satisfy the QOS bandwidth required for the communication to the mobile agent and to compensate for any low SNR of the communication received at the mobile agent.

A management frame from the base station specifies the slot and antenna assignments for the mobile agent to receive frames sent to the upper protocol layers of the mobile agent. In FIG. 8, frame demultiplexer 810 provides this assignment to the sphere detector 812 and the receive processing block 814. A management frame from the base station also specifies the slot and antenna assignments for the mobile agent to transmit frames from the upper protocol layers of the mobile agent. Frame demultiplexer 810 provides this assignment to the transmit processing block 816.

When the base station shown in FIG. 7 has established a communication with the mobile agent shown in FIG. 8, the physical block 702 in FIG. 7 and the physical block 802 in FIG. 8 form a physical (PHY) layer of the communication protocol. Similarly, the MAC 704 in FIG. 7 and the MAC 804 in FIG. 8 form a MAC layer of the communication protocol. The physical and MAC layers cooperate to provide cross-layer allocation of the spectral resources based on the SNR of communications the mobile agent receives from the base station and the SNR of communications the base station receives from the mobile agent.

Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A system for cross-layer allocation of a spectral resource, comprising:
   a media access controller (MAC) including an allocation circuit, wherein the allocation circuit is configured to assign a portion of the spectral resource to a spatially multiplexed communication in response to a signal to noise ratio (SNR); and
   a physical (PHY) layer including:
      a plurality of transmitting antennas for transmitting the spatially multiplexed communication in the portion of the spectral resource, the transmit antennas configured to transmit corresponding ones of a plurality of symbols in a constellation,
      a plurality of receiving antennas for receiving the spatially multiplexed communication from the transmitting antennas,
      an estimating circuit coupled to the allocation circuit of the MAC and the receiving antennas, the estimating circuit configured to determine the SNR of the spatially multiplexed communication received at the receiving antennas, and
      a sphere detector circuit coupled to the allocation circuit of the MAC and the receiving antennas, the sphere detector circuit configured to calculate a plurality of respective costs for a plurality of possible combinations of the symbols in the constellation, each of the possible combinations including one of the symbols for each of the transmitting antennas, the sphere detector circuit configured to calculate the respective costs of the possible combinations from the portion of the spectral resource of the spatially multiplexed communication received at the receiving antennas, the sphere detector circuit further configured to select one of the possible combinations in response to the respective costs, wherein the sphere detector detects the symbols of the one of the possible combinations to be the corresponding symbols of the spatially multiplexed communication transmitted from the transmitting antennas.

2. The system of claim 1, wherein:
   the spectral resource is a range of radio frequencies in an electromagnetic spectrum, the range of radio frequencies subdivided into a plurality of subcarriers, and
   the allocation circuit of the MAC is configured to assign the portion of the spectral resource to be one or more of a plurality of time periods on one or more of the subcarriers in response to a specified quality of service for the communication and the SNR of the communication received at the receiving antennas of the PHY block.

3. The system of claim 1, wherein the allocation circuit is configured to assign the portion of the spectral resource to the communication in response to a specified data rate of the communication and an expected rate that the sphere detector circuit of the PHY block calculates the respective costs of the possible combinations and selects the one of the possible combinations in response to the respective costs, the expected rate being a function of the SNR.

4. A system for detecting a communication transmitted from a first plurality of antennas, comprising:
   a media access controller (MAC) including an allocation circuit, wherein in response to a signal to noise ratio (SNR), the allocation circuit assigns a portion of a spectral resource to the communication; and a physical (PHY) block coupled to the MAC, the PHY block including,
- a second plurality of antennas for receiving the communication from the transmitting first plurality of antennas,
- an estimating circuit that determines the SNR of the communication received at the second plurality of antennas, and
- a sphere detector circuit that calculates a plurality of respective costs for a plurality of possible combinations of a plurality of symbols in a constellation, each of the possible combinations including a corresponding one of the symbols for each of the first plurality of antennas,
- wherein the sphere detector circuit calculates the respective costs of the possible combinations from the portion of the spectral resource of the communication received at the second plurality of antennas, and
- wherein the sphere detector circuit further selects one of the possible combinations in response to the respective costs, the symbols of the one of the possible combinations being detected to be the communication transmitted from the first plurality of antennas;

wherein the allocation circuit assigns the portion of the spectral resource to the communication in response to a specified data rate of the communication and an expected rate that the sphere detector circuit of the PHY block calculates the respective costs of the possible combinations and selects the one of the possible combinations in response to the respective costs, the expected rate being a function of the SNR.

5. The system of claim 4, wherein the communication is spatially multiplexed from the first plurality of antennas to the second plurality of antennas.

6. The system of claim 4, wherein:
the spectral resource is a range of radio frequencies in an electromagnetic spectrum, the range of radio frequencies subdivided into a plurality of subcarriers, and
the allocation circuit of the MAC assigns the portion of the spectral resource to be one or more of a plurality of time periods on one or more of the subcarriers.

7. The system of claim 4, wherein:
a base station includes the MAC and the PHY block,
the base station transfers an identification of the portion of the spectral resource to a mobile agent having the first plurality of antennas,
the mobile agent transmits the communication from the first plurality of antennas in the portion of the spectral resource specified in the identification, and
the base station receives the communication in the portion of the spectral resource at the second plurality of antennas of the PHY block.

8. The system of claim 7, wherein the base station transfers the identification to the mobile agent in another communication from the second plurality of antennas to the first plurality of antennas using another portion of the spectral resource.

9. The system of claim 4, wherein:
a mobile agent includes the PHY block, the mobile agent configured to transfer to a base station the SNR of the communication received at the second plurality of antennas of the PHY block, and
the base station includes the MAC and the first plurality of antennas, the base station configured to transmit the communication from the first plurality of antennas in the portion of the spectral resource, the base station also configured to transfer an identification of the portion of the spectral resource to the mobile agent, the mobile agent configured to receive the communication at the second plurality of antennas in the portion of the spectral resource specified in the identification.

10. The system of claim 9, wherein:
the mobile agent transfers the SNR to the base station in a second communication from the second plurality of antennas to the first plurality of antennas using a second portion of the spectral resource, and
the base station transfers the identification to the mobile agent in a third communication from the first plurality of antennas to the second plurality of antennas using a third portion of the spectral resource.

11. The system of claim 4, wherein the estimating circuit of the PHY block determines, for each of a plurality of subsets of the first plurality of antennas, a respective SNR of the communication received at the second plurality of antennas from the subset of the first plurality of antennas.

12. The system of claim 11, wherein the allocation circuit of the MAC assigns a respective subportion of the portion of the spectral resource to each of the subsets of the first plurality of antennas in response to the respective SNR of the communication received from the subset of the first plurality of antennas.

13. The system of claim 4, wherein the allocation circuit of the MAC assigns the portion of the spectral resource to the communication in response to a specified quality of service for the communication and the SNR of the communication received at the second plurality of antennas.

14. The system of claim 4, wherein the allocation circuit of the MAC assigns to the communication the portion that is a number of a plurality of units of the spectral resource of an electromagnetic spectrum, each of the units being one of a plurality of time periods of one of a plurality of radio frequency bands of the electromagnetic spectrum, the number being a function of the SNR of the communication received at the second plurality of antennas.

15. The system of claim 14, wherein the allocation circuit of the MAC determines the number of the units of the spectral resource as a function of a specified quality of service (QOS) for the communication and the SNR of the communication received at the second plurality of antennas.

16. The system of claim 14, wherein the allocation circuit of the MAC determines the number of the units of the spectral resource from a ratio of a specified data rate for the communication and an expected rate of the sphere detector circuit of the PHY block performing the calculating of the respective costs of the possible combinations and the selecting of the one of the possible combinations in response to the respective costs.

17. The system of claim 16, wherein the allocation circuit of the MAC determines the number of the units of the spectral resource from the ratio of the specified data rate and the expected rate at the SNR of the communication received at the second plurality of antennas.

18. The system of claim 16, wherein the sphere detector circuit of the PHY block is a depth-first sphere-detector circuit and the allocation circuit of the MAC determines the expected rate of the depth-first sphere-detector circuit performing the calculating and the selecting at the SNR of the communication received at the second plurality of antennas.

19. The system of claim 18, wherein:

the MAC further includes a database coupled to the allocation circuit, the database specifies a plurality of projected rates of the depth-first sphere-detector circuit performing the calculating and the selecting, each of the projected rates corresponds to a respective possible SNR of the communication received at the second plurality of antennas, each of the projected rates is a stochastically determined rate of the depth-first sphere-detector circuit performing the calculating and the selecting at the respective possible SNR, and the allocation circuit determines the expected rate as the projected rate that corresponds to the respective possible SNR matching the SNR of the communication received at the second plurality of antennas.

20. The system of claim 4, wherein:

the PHY block further includes an interface circuit coupled to the second plurality of antennas, the interface circuit transforms the communication received at the second plurality of antennas into a digital representation of the communication, the estimating and sphere detector circuits are coupled to the second plurality of antennas via the interface circuit, the estimating circuit determines the SNR of the communication received at the second plurality of antennas from the digital representation, and the sphere detector circuit calculates the respective costs of the possible combinations from the digital representation.

\* \* \* \* \*